No. 785,731. PATENTED MAR. 28, 1905.
C. F. HEINKEL.
MEANS FOR CONVERTING ELECTRICAL CURRENTS FOR INDUCTION MOTORS.
APPLICATION FILED AUG. 4, 1904.
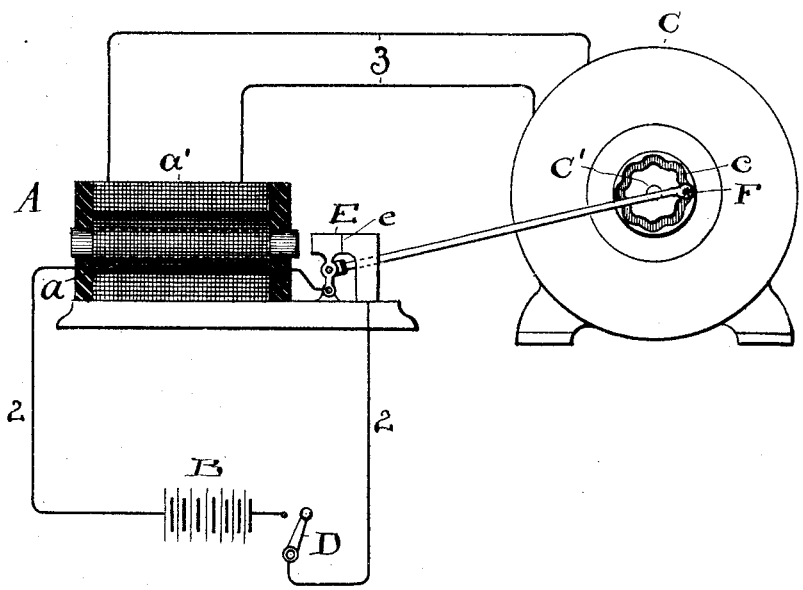
WITNESSES:
INVENTOR.
Christian F. Heinkel
BY H. S. Fisher
ATTORNEY.

No. 785,731. Patented March 28, 1905.

UNITED STATES PATENT OFFICE.

CHRISTIAN F. HEINKEL, OF CLEVELAND, OHIO.

MEANS FOR CONVERTING ELECTRICAL CURRENTS FOR INDUCTION-MOTORS.

SPECIFICATION forming part of Letters Patent No. 785,731, dated March 28, 1905.

Application filed August 4, 1904. Serial No. 219,545.

*To all whom it may concern:*

Be it known that I, CHRISTIAN F. HEINKEL, a citizen of the United States, residing at Cleveland, in the county of Cuyahoga and State of Ohio, have invented certain new and useful Improvements in Means for Converting Electrical Currents for Induction-Motors; and I do declare that the following is a full, clear, and exact description of the invention, which will enable others skilled in the art to which it appertains to make and use the same.

My invention relates to means for converting electrical currents for induction-motors; and the invention comprises the arrangement and combination of parts and elements substantially as hereinafter shown and more particularly pointed out in the claims.

Referring to the drawing, the single figure therein represents an induction-coil A or any other suitable transformer, batteries B or any other primary source of continuous electrical current, and an induction-motor C. Connections 2 from batteries B lead to the primary winding $a$ of coil A, and a switch D and a make-and-break vibrator or regulator E are connected in said primary-winding connection for opening and closing the primary circuit. Secondary leads 3 from secondary winding $a'$ of coil A connect with the terminals of induction-motor C. When switch D is closed, the continuous current flowing through primary winding $a$ causes an induced current to flow to motor C, which upon rotation operates vibrator or regulator E by means of a cam C upon motor-shaft C', and a reciprocating member F, traveling in contact with said cam. Member F is pivotally connected with vibrator or regulator E to actuate said regulator in timed unison with said motor to make and break contact at $e$, and thereby convert the continuous current into an alternating current. The result is a large saving of continuous current.

Although I am aware that it is old to derive an alternating current by means of an induction-coil, I am not aware that an induction-motor has been mechanically connected to time the make and break for the induction-coil to correspond to the rotation and cycles of the motor, and thereby provide the greatest economy of current in operating the motor at its highest efficiency.

The number of vibrations to be imparted to regulator E is determined by the cycles and revolutions of motor used, and the cam is of corresponding construction to give the desired result.

Any mechanism in place of cam $c$ may be used to operate vibrator or regulator E, providing that a timed make and break is obtained which is synchronized with the cycles and revolutions of the motor.

What I claim is—

1. A transformer and a source of continuous current therefor and a circuit-breaker for said transformer, in combination with an induction-motor mechanically connected with said breaker to produce a timed movement with said motor.

2. An induction-coil and a source of continuous current therefor, make-and-break mechanism in the primary circuit of said coil, an induction-motor electrically connected with the secondary winding of said coil, and means for operating said make-and-break mechanism in timed movement with said motor.

3. A transformer and a source of current therefor, a circuit-breaker for said transformer, a motor electrically connected with said transformer, and synchronizing mechanism for said motor and transformer.

In testimony whereof I sign this specification in the presence of two witnesses.

CHRISTIAN F. HEINKEL.

Witnesses:
R. B. MOSER,
C. A. SELL.